United States Patent
Spangler et al.

(10) Patent No.: US 7,936,359 B2
(45) Date of Patent: May 3, 2011

(54) RECONFIGURABLE FLOATING POINT FILTER

(75) Inventors: Steven J. Spangler, El Dorado Hills, CA (US); Benjamin R. Pletcher, Mather, CA (US)

(73) Assignee: Intel Corporation, Santa Clara, CA (US)

( * ) Notice: Subject to any disclaimer, the term of this patent is extended or adjusted under 35 U.S.C. 154(b) by 1139 days.

(21) Appl. No.: 11/375,174

(22) Filed: Mar. 13, 2006

(65) Prior Publication Data

US 2007/0211068 A1  Sep. 13, 2007

(51) Int. Cl.
*G09G 5/00* (2006.01)

(52) U.S. Cl. ........ 345/606; 345/582; 345/586; 345/592; 345/608; 345/609; 345/610; 382/260; 382/300; 382/304

(58) Field of Classification Search .......... 345/608–610
See application file for complete search history.

(56) References Cited

U.S. PATENT DOCUMENTS

| | | | | |
|---|---|---|---|---|
| 6,088,445 | A * | 7/2000 | Chadha et al. | 379/406.08 |
| 6,373,414 | B2 * | 4/2002 | Koga et al. | 341/100 |
| 6,571,264 | B1 * | 5/2003 | Lee | 708/495 |
| 6,778,188 | B2 * | 8/2004 | Emberling et al. | 345/606 |
| 6,924,812 | B2 | 8/2005 | Koneru et al. | |
| 6,947,054 | B2 | 9/2005 | Spangler | 345/582 |
| 7,158,147 | B2 * | 1/2007 | Watson et al. | 345/609 |
| 7,324,116 | B2 * | 1/2008 | Boyd et al. | 345/582 |
| 7,355,603 | B2 * | 4/2008 | Donovan et al. | 345/582 |
| 2003/0001861 | A1 * | 1/2003 | Watson et al. | 345/609 |

OTHER PUBLICATIONS

Intel 810 Chipset: Intel 82810/82810-DC100 Graphics and Memory Controller Hub (GMCH) Datasheet Jun. 1999, Order No. 290656-002; 120 pages.

* cited by examiner

*Primary Examiner* — Antonio A Caschera
(74) *Attorney, Agent, or Firm* — Trop, Pruner & Hu, P.C.

(57) ABSTRACT

A reconfigurable floating point data filter may be implemented by configuring a texture filter in response to state data, where the state data specifying at least a data width of input texture data to be filtered, where the input texture data is in a floating point format, filtering the input texture data using the texture filter, and then reconfiguring the texture filter to be substantially fully utilized when the data width of the input texture data changes.

5 Claims, 7 Drawing Sheets

RECONFIGURABLE FLOATING POINT FILTER

BACKGROUND

Data filters are commonly used to interpolate or filter between discrete data samples. For example, a typical 3D graphics system employs a pipelined data rendering scheme including a rasterizer stage employing one or more texture filters to interpolate or filter texel data. In doing so, a hardware-implemented texture filter's input will be as wide as the widest texel data that the filter may be expected to process. For example, a texture filter unit or module may need to be wide enough to process 32-bit wide texel data. In that case, a typical texture filter unit would be fully utilized when filtering 32-bit wide texel data but would be partially idle when filtering narrower 16-bit or 8-bit texel data.

BRIEF DESCRIPTION OF THE DRAWINGS

The accompanying drawings, incorporated in and constituting a part of this specification, illustrate one or more implementations consistent with the principles of the invention and, together with the description of the invention, explain such implementations. The drawings are not necessarily to scale, the emphasis instead being placed upon illustrating the principles of the invention. In the drawings.

FIG. 4 is a flow chart illustrating an example process for employing a reconfigurable floating point filter in accordance with the invention;

FIG. 5 illustrates some representative geometric quantities useful for describing the process of FIG. 4;

DETAILED DESCRIPTION

The following description refers to the accompanying drawings. Among the various drawings the same reference numbers may be used to identify the same or similar elements. While the following description provides a thorough understanding of the various aspects of the claimed invention by setting forth specific details such as particular structures, architectures, interfaces, techniques, etc., such details are provided for purposes of explanation and should not be viewed as limiting. Moreover, those of skill in the art will, in light of the present disclosure, appreciate that various aspects of the invention claimed may be practiced in other examples or implementations that depart from these specific details. At certain junctures in the following disclosure descriptions of well known devices, circuits, and methods have been omitted to avoid clouding the description of the present invention with unnecessary detail.

Figure 1:
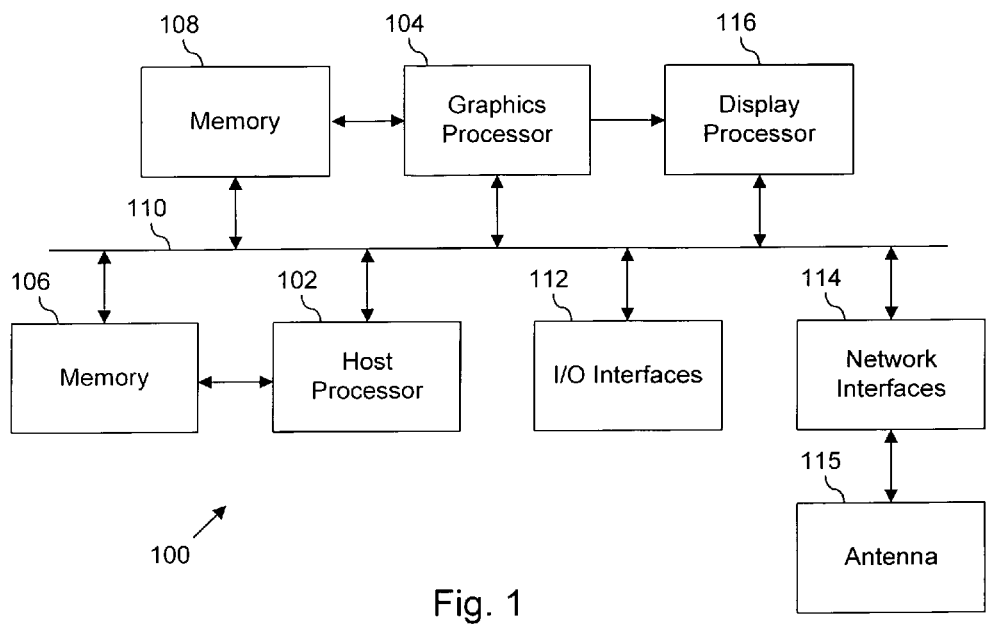
FIG. 1 illustrates an example graphics processing system.

FIG. 1 illustrates an example system 100 according to an implementation of the invention. System 100 may include a host processor 102, a graphics processor 104, memories 106 and 108 (e.g., dynamic random access memory (DRAM), static random access memory (SRAM), flash, etc.), a bus or communications pathway(s) 110, input/output (I/O) interfaces 112 (e.g., universal synchronous bus (USB) interfaces, parallel ports, serial ports, telephone ports, and/or other I/O interfaces), network interfaces 114 (e.g., wired and/or wireless local area network (LAN) and/or wide area network (WAN) and/or personal area network (PAN), and/or other wired and/or wireless network interfaces), and a display processor and/or controller 116. System 100 may also include an antenna 115 (e.g., dipole antenna, narrowband Meander Line Antenna (MLA), wideband MLA, inverted "F" antenna, planar inverted "F" antenna, Goubau antenna, Patch antenna, etc.) coupled to network interfaces 114. System 100 may be any system suitable for processing 3D graphics data and providing that data in a rasterized format suitable for presentation on a display device (not shown) such as a liquid crystal display (LCD), or a cathode ray tube (CRT) display to name a few examples.

System 100 may assume a variety of physical implementations. For example, system 100 may be implemented in a personal computer (PC), a networked PC, a server computing system, a handheld computing platform (e.g., a personal digital assistant (PDA)), a gaming system (portable or otherwise), a 3D capable cellular telephone handset, etc. Moreover, while all components of system 100 may be implemented within a single device, such as a system-on-a-chip (SOC) integrated circuit (IC), components of system 100 may also be distributed across multiple ICs or devices. For example, host processor 102 along with components 106, 112, and 114 may be implemented as multiple ICs contained within a single PC while graphics processor 104 and components 108 and 116 may be implemented in a separate device such as a television coupled to host processor 102 and components 106, 112, and 114 through communications pathway 110.

Host processor 102 may comprise a special purpose or a general purpose processor including any control and/or processing logic, hardware, software and/or firmware, capable of providing graphics processor 104 with 3D graphics data and/or instructions. Processor 102 may perform a variety of 3D graphics calculations such as 3D coordinate transformations, etc. the results of which may be provided to graphics processor 104 over bus 110 and/or that may be stored in memories 106 and/or 108 for eventual use by processor 104.

In one implementation, host processor 102 may be capable of performing any of a number of tasks that support filtering of floating point data. These tasks may include, for example, although the invention is not limited in this regard, providing 3D graphics data to graphics processor 104, downloading microcode to processor 104, initializing and/or configuring registers within processor 104, interrupt servicing, and providing a bus interface for uploading and/or downloading 3D graphics data. In alternate implementations, some or all of these functions may be performed by processor 104. While system 100 shows host processor 102 and graphics processor 104 as distinct components, the invention is not limited in this regard and those of skill in the art will recognize that processors 102 and 104 possibly in addition to other components of system 100 may be implemented within a single IC.

Graphics processor 104 may comprise any processing logic, hardware, software, and/or firmware, capable of processing graphics data. In one implementation, graphics processor 104 may implement a 3D graphics architecture capable of processing graphics data in accordance with one or more standardized rendering application programming interfaces (APIs) such as OpenGL 2.0™ ("The OpenGL Graphics System: A Specification" (Version 2.0; Oct. 22, 2004)) and DirectX 9.0™ (Version 9.0c; Aug. 8, 2004) to name a few examples, although the invention is not limited in this regard. Graphics processor 104 may process 3D graphics data provided by host processor 102, held or stored in memories 106 and/or 108, and/or provided by sources external to system 100 and obtained over bus 110 from interfaces 112 and/or 114.

Graphics processor 104 may receive 3D graphics data in the form of 3D scene data and process that data to provide image data in a format suitable for conversion by display processor 116 into display-specific data. In addition, graphics processor 104 may implement a variety of 3D graphics processing components and/or stages (not shown) such as an applications stage, a geometry stage and/or a rasterizer stage. Further, the rasterizer stage implemented by graphics processor 104 may include a reconfigurable floating point data filter in accordance with the invention as will be described in greater detail below.

Bus or communications pathway(s) 110 may comprise any mechanism for conveying information (e.g., graphics data, instructions, etc.) between or amongst any of the elements of system 100. For example, although the invention is not limited in this regard, communications pathway(s) 110 may comprise a multipurpose bus capable of conveying, for example, instructions (e.g., macrocode) between processor 102 and processor 104. Alternatively, pathway(s) 110 may comprise a wireless communications pathway.

Display processor 116 may comprise any processing logic, hardware, software, and/or firmware, capable of converting image data supplied by graphics processor 104 into a format suitable for driving a display (i.e., display-specific data). For example, while the invention is not limited in this regard, processor 104 may provide image data to processor 116 in a specific color data format, for example in a compressed red-green-blue (RGB) format, and processor 116 may process such RGB data by generating, for example, corresponding LCD drive data levels etc. Although FIG. 1 shows processors 104 and 116 as distinct components, the invention is not limited in this regard, and those of skill in the art will recognize that, for example, some if not all of the functions of display processor 116 may be performed by processor 104.

Figure 2:
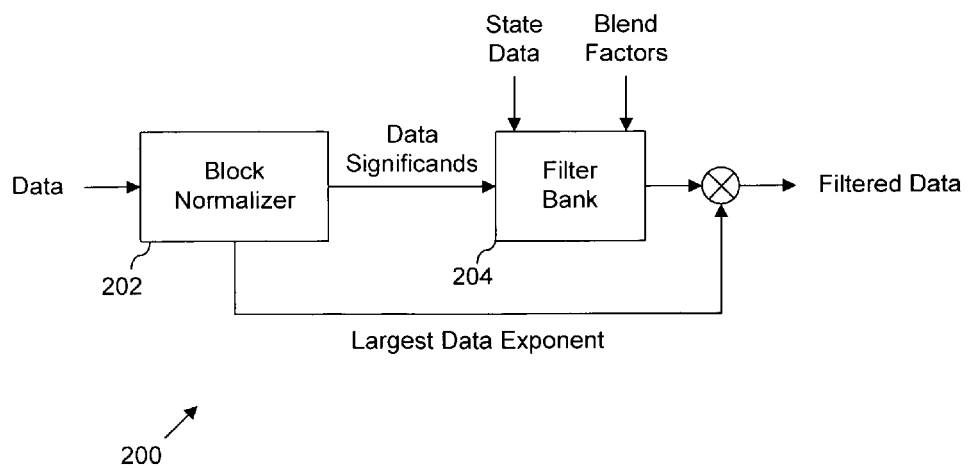
FIG. 2 illustrates a reconfigurable floating point filter in accordance with the invention.

FIG. 2 is a simplified block diagram of a reconfigurable floating point filter 200, such as might be implemented by processor 104 of system 100, in accordance with an instantiation of the claimed invention. Filter 200 may include block normalizer 202 and filter bank 204. Filter bank 204 may, in accordance with the invention, be capable of reconfigurable floating point filtering in response to input blend factors as well as input state data as will be described in greater detail below. In some implementations of the invention filter 200 may be reconfigurable such that filter 200 is substantially fully utilized regardless of the data width of the data input to filter 200. While filter 200 is shown as employing one filter bank 204, the invention is not limited in this regard and those skilled in the art will recognize that filter 200 may employ more than one filter bank 204.

Block normalizer 202 may be capable of block normalizing floating point input data to yield data in a block normalized format. As those skilled in the art will recognize, normalizer 202 may use well known techniques to block normalize the floating point input data so as to conform to, for example, the Institute of Electrical and Electronics Engineers (IEEE) Standard for Binary Floating-Point Arithmetic (ANSI/IEEE Std 754-1985) also known as IEC 60559:1989, Binary Floating-Point Arithmetic for Microprocessor Systems Standard, although the invention is not limited in this regard and normalizer 202 may block normalize the input data so as to conform to other floating point arithmetic schemes.

As shown in FIG. 2, normalizer 202 of filter 200 may supply the fractions or significands of the block normalized input data to filter bank 204, while an associated exponent may be passed around filter bank 204 and recombined with the filtered output data of filter bank 204. Those skilled in the art will recognize that the block normalized data output from normalizer 202 may have a range of exponent values. In accordance with the invention, normalizer 202 may pass the largest of those exponent values around filter bank 204, and also may, before passing the significands to bank 204, right shift the significands of the input data having smaller exponent values by the respective differences between their exponent values and the largest exponent value. For example, if four data samples are being filtered by filter 200 and one sample has an exponent value of twelve while the other sample have exponent values of eight, then normalizer 202 may pass the exponent value of twelve around filter bank 204 and right shift by four bits the significands of the input data sample with exponent values of eight before passing all four significands to bank 204 for filtering.

Figure 3:
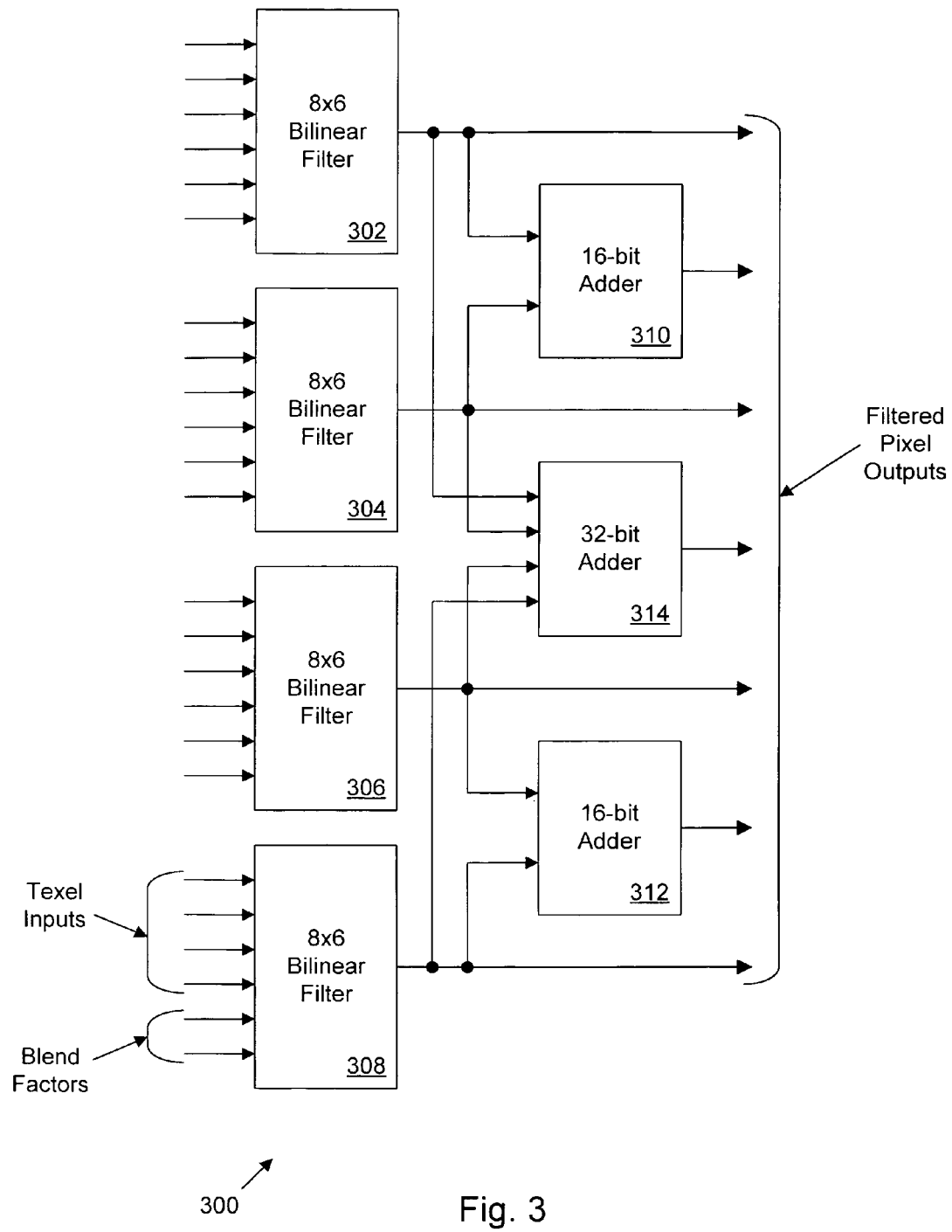
FIGS. 3-5 illustrate various implementations of the filter of FIG. 2.

FIG. 3 is a simplified block diagram illustrating a filter bank 300 of a reconfigurable floating point filter in accordance with the invention, such as filter bank 204 of FIG. 2. While bank 300, as shown, implements a reconfigurable floating point bilinear texture filter, the invention is not limited to texture filters and contemplates filtering of data in general. Thus, while filter 200 and/or bank 300 may be utilized to undertake texture filtering, bilinear or otherwise, filter 200 and/or bank 300, in accordance with the invention, may be utilized to undertake other types of data filtering. For example, filter 200 and/or bank 300 could be utilized to undertake image filtering such as image sharpening, image smoothing etc. In general, filter 200 and/or bank 300 may be used in any circumstance where interpolation between discrete data samples is required (e.g., in conjunction with lookup tables for mathematical operations (log, sin, cos functions, etc.).

Bank 300 employs four 8×6 bilinear filter units 302-308, each unit 302-308 having four texel inputs and two blend factor inputs. Those skilled in the art will recognize that labeling a filter unit as 8×6 signifies that each texel input has an 8-bit data width and each blend factor input has 6-bit data width. Bank 300 also includes two 16-bit adders 310 and 312 as well as a 32-bit adder 314. Implementations of adders 310-314 will be discussed in greater detail below.

While bank 300 employs 8×6 bilinear filter units, the invention is not limited in this regard and texel input and/or blend factor inputs having other than 8-bit and 6-bit respective data widths are contemplated by the invention. Moreover, while bank 300 employs filter units for undertaking bilinear texture filtering, the invention is not limited to a particular type of texture filtering. Thus, as those skilled in the art will recognize, the claimed invention contemplates, with appropriate modifications to the filter units, other texture filtering schemes including trilinear, anisotropic, bi-cubic, four-by-four, etc.

While in the above discussion of bank 300 and elsewhere in this detailed description, filtering of texels is described in terms of filtering on a per-pixel basis those skilled in the art will recognize that filtering may be undertaken on a per-channel basis where each pixel is represented by four channels including red (R), green (G), blue (B), and alpha channels, to name one possibility. Thus, for example, each 8-bit texel to be filtered by bank 300 may comprise respective 8-bit R, G, B and alpha channel values. Hence, in this example, each of bilinear filter units 302-308 may include four channel units, one each for filtering the respective R, G, B and alpha values. The invention is, however, not limited to a particular number of pixel channels or type of pixel channels, and hence, to provide clarity to the description of the invention, filter banks 204, 300 and subsequent filter banks to be discussed below are described in terms of pixels rather than pixel channels.

Figure 4:
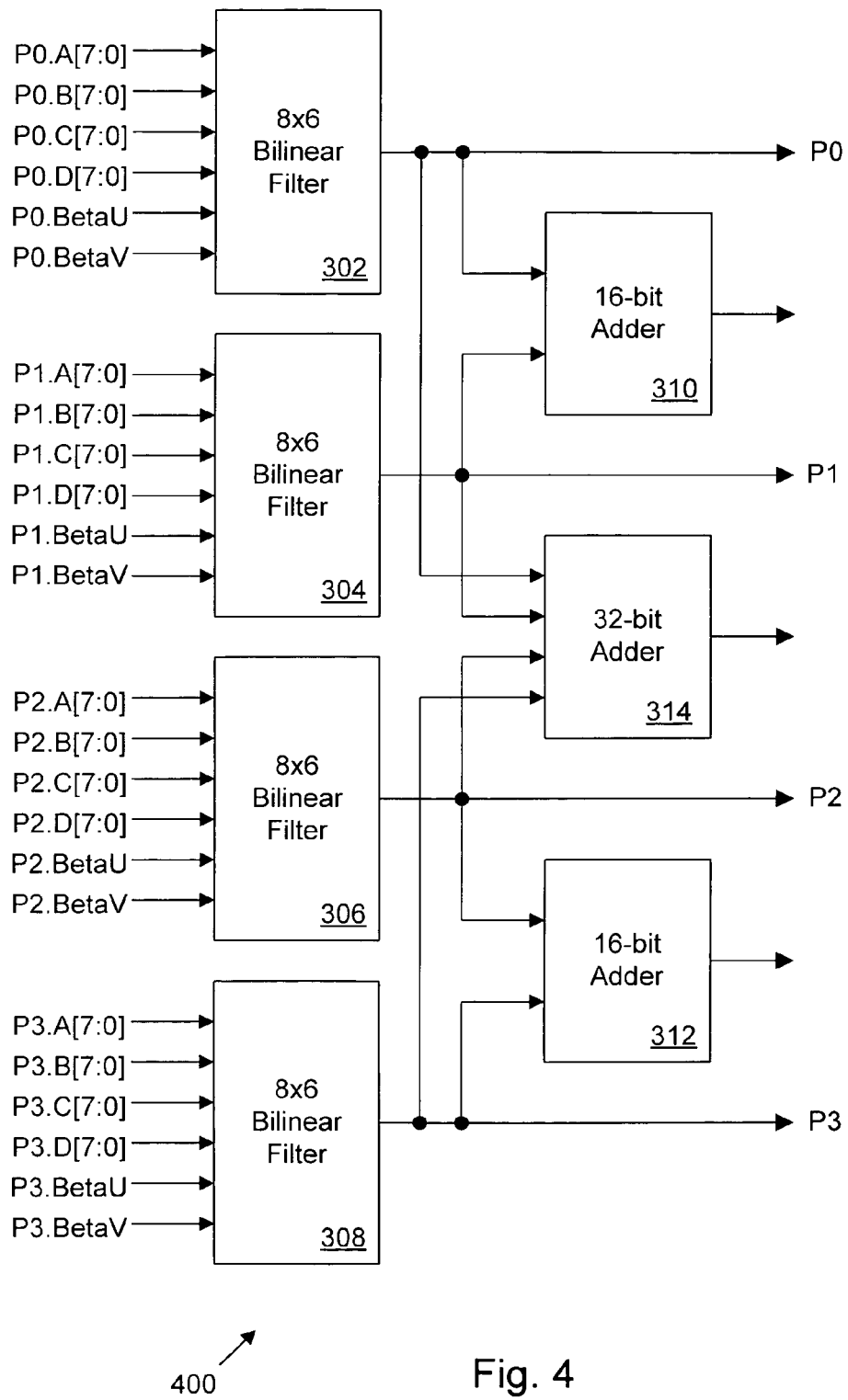
Figure 5:
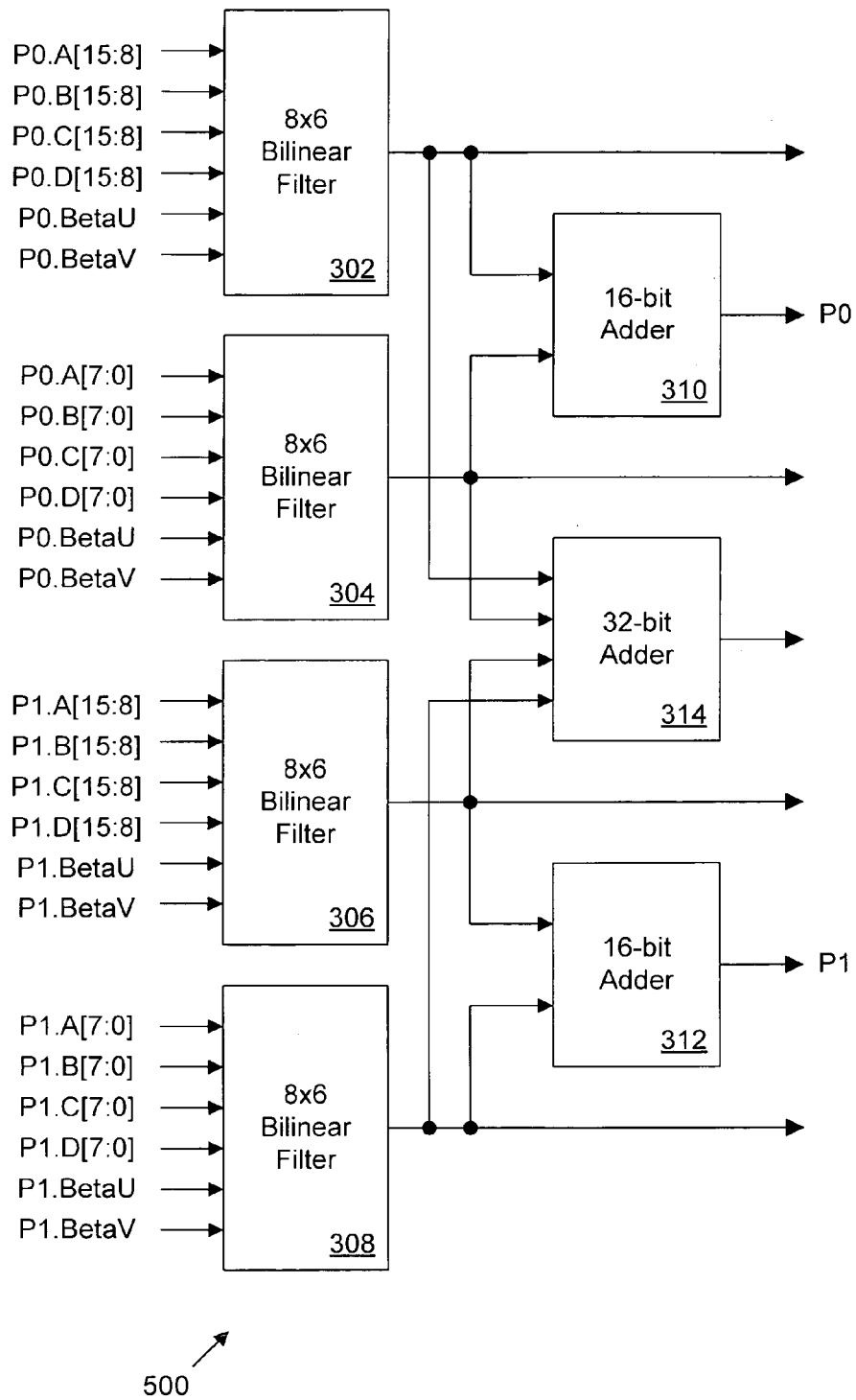
Figure 6:
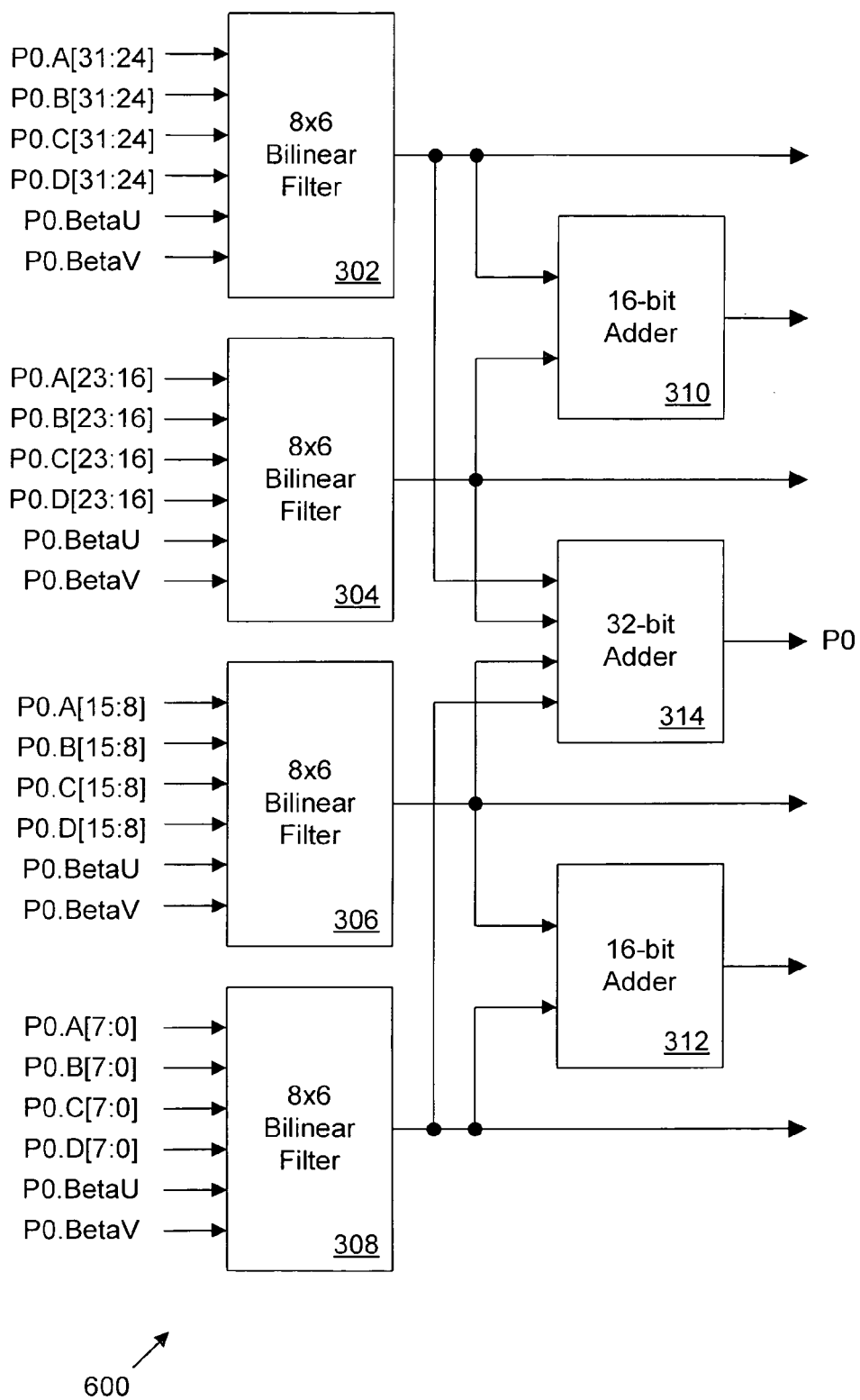
FIG. 6 is a schematic depiction of a filter bank according to one embodiment.

FIGS. 4-6 are simplified block diagrams illustrating three distinct configurations of a filter bank of a reconfigurable floating point filter in accordance with implementations of the invention, such as filter bank 300 of FIG. 3. FIG. 4 illustrates a configuration 400 of filter bank 300, configured to undertake, in parallel, bilinear filtering yielding four filtered output pixels P0-P3, where each output pixel may be generated by filtering four 8-bit texel inputs A-D. Thus, for example, configuration 400 enables the texture filter processing of four 8-bit pixels in one computation or clock cycle.

FIG. 5 illustrates a configuration 500 of filter bank 300, configured to undertake, in parallel, bilinear filtering to yield two 16-bit filtered output pixels P0 and P1, where the input texels have 16-bit data widths. Thus, in configuration 500, each output pixel may be generated by filtering eight 8-bit texel inputs A-D, where the eight upper bits of each 16-bit texel are filtered by one filter unit and the lower eight bits by another filter unit. For example, the four 16-bit input texels A-D to be filtered to generate output pixel P0 may be supplied as input to filter units 302 and 304 where the lower eight bits (i.e., [7:0]) of each texel are input to unit 304 while the upper eight bits (i.e., [15:8]) of each texel are input to unit 302. The 8-bit outputs of units 302 and 304 may then be added together in 16-bit adder 310 to yield the 16-bit output pixel P0. The 16-bit output pixel P1 may be generated in a similar manner using units 306/308 and adder 312. Thus, configuration 500 enables the texture filter processing of two 16-bit pixels in one computation or clock cycle.

FIG. 6 illustrates a configuration 600 of filter bank 300, configured to undertake bilinear filtering for one 32-bit output pixel P0, where the input texels have 32-bit data widths. Thus, in configuration 600, the output pixel may be generated by filtering four 32-bit texels A-D, the data for each texel being distributed across four of the sixteen 8-bit texel inputs, where bits [31:24] of the texels may be filtered by unit 302, bits [23:16] may be filtered by unit 304, bits [15:8] may be filtered by unit 306, and bits [7:0] may be filtered by unit 308. The 8-bit outputs of units 302-308 may then be added together in 32-bit adder 314 to yield the 32-bit output pixel P0. Thus, configuration 600 enables the texture filter processing of one 32-bit pixel in one computation or clock cycle.

Figure 7:
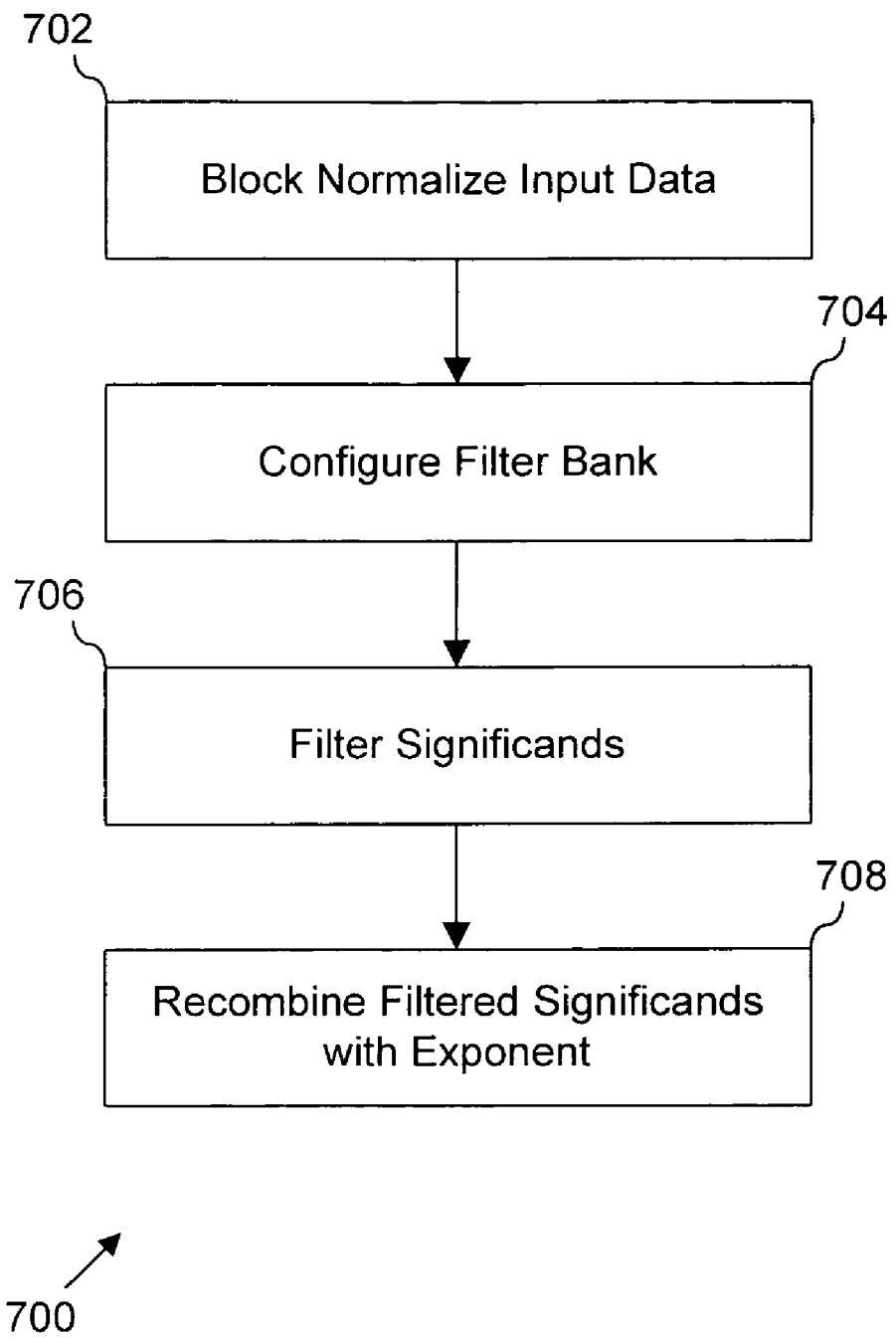
FIG. 7 is a flow chart for one embodiment.

FIG. 7 is a flow chart illustrating a process 700 for employing a reconfigurable floating point filter in accordance with an implementation of the invention. While, for ease of explanation, process 700 may be described with regard to system 100 of FIG. 1, filter 200 of FIG. 2, and the example filter configurations of FIGS. 3-6, the claimed invention is not limited in this regard and other processes or schemes supported by appropriate devices in accordance with the claimed invention are possible. For example, while process 700 may be described in the context of bilinear filtering of graphics data (i.e., texels), the invention is not limited in this regard and, thus, process 700 may be applied to filtering of any data, graphics or otherwise.

Figure 8:
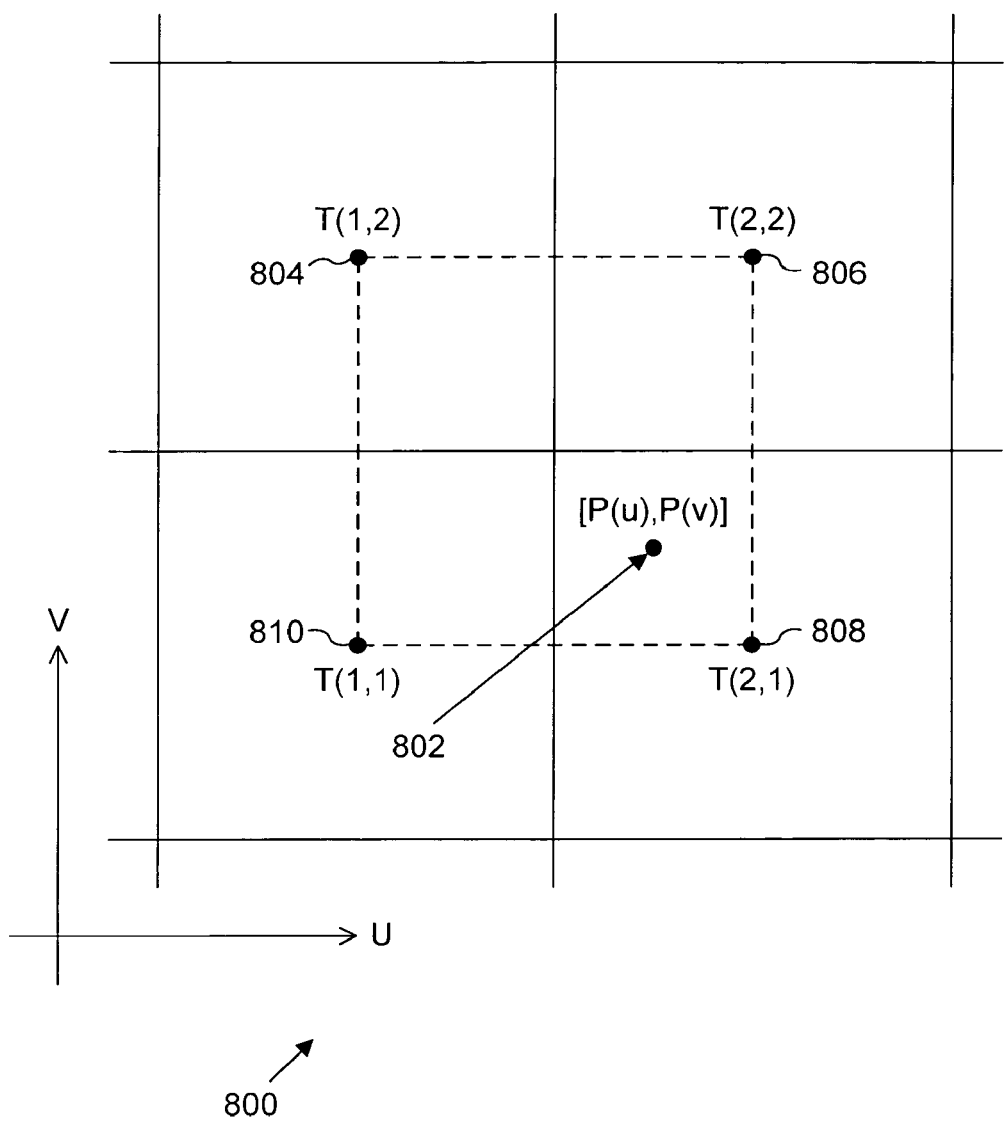
FIG. 8 is a depiction of a block in a texel space according to one embodiment.

FIG. 8 illustrates some representative geometric quantities associated with bilinear texture filtering that, while aiding discussion of process 700, should not be construed to limit the claimed invention in anyway. As stated previously, while implementations of the invention will be discussed in the context of bilinear texture filtering, the invention is not limited to any particular type of texture filtering.

Process 700 may begin with the block normalization of input data [act 702]. In one implementation, block normalizer 202 may undertake act 702 by block normalizing floating point texel input data to yield block normalized texel data. Thus, act 702 may, in part, comprise normalizer 202 converting texel data (i.e., binary data describing texture vertices) in a floating point format into texel data in a block-normalized format where each texel's block-normalized data comprises a fraction or significand and an associated exponent.

While undertaking act 702, normalizer 202 may pass the largest exponent value of the texel data around filter bank 204, and may, before passing the texel significands to bank 204, right shift the significands of the texels having smaller exponents by the respective differences in their exponent values. For example, if four texels are to be filtered by filter 200 and one texel has an exponent value of twelve while the other texels have exponent values of ten, then normalizer 202 may, as part of act 702, pass the exponent value of twelve around filter bank 204 and right shift the significands of the texels other than the texel having the exponent value of twelve by two bits before passing all texel significands to bank 204 for filtering.

Process 700 may continue with the configuration of the filter bank [act 704]. In one implementation, state data associated with the input data may configure the filter bank. However, the invention is not limited in this regard and, for example, in another implementation, the state data may be supplied by processor 104. Referring to filter bank 300, the state data may configure units 302-308 and/or adders 310-314 to implement different filter modes or configurations. For example, referring to FIG. 4, if 8-bit texels are to be filtered then configuration 400 may be specified by the state data. In configuration 400, bank 300 has been configured such that four pixels may be texture filtered at the same time where the output of each unit 302-308 may directly provide four filtered 8-bit output pixels P0-P3.

Alternatively, referring to FIG. 5, if 16-bit texels are to be filtered then configuration 500 may be specified by the state data in act 704. In configuration 500, bank 300 has been configured such that two pixels may be texture filtered at the same time where the output of filter units 302 and 304 are added together by adder 310 to provide one filtered 16-bit output pixel P0 and the output of filter units 306 and 308 are added together by adder 312 to provide a second filtered 16-bit output pixel P1. As a final example, referring to FIG. 6, if 32-bit texels are to be filtered then configuration 600 may be specified by the state data in act 704. In configuration 600, bank 300 has been configured by the state data such that one pixel may be texture filtered at a time where the input texel data is distributed across all four units 302-304 and the output of those units are added together by adder 314 to provide one filtered 32-bit output pixel P0.

Process 700 may continue with filtering of the normalized input data significands [act 706]. In one implementation, each unit 302-308 of filter 300 may, upon configuration in act 704, undertake filtering of the texel significands provided by normalizer 202. For example, in implementations, such as FIGS. 4-6, where units 302-308 implement bilinear filtering, act 706 may comprise bilinear filtering of the texel significands.

FIG. 8 illustrates some representative geometric quantities useful for describing the filtering of act 706 in the context of bilinear filtering. Those skilled in the art will recognize that FIG. 8 is intended merely as an example to aid in the following discussion of act 706 and the quantities and/or relationships shown therein should not be construed to limit the claimed invention in anyway. FIG. 8 shows an example block 800 in texel space (e.g., T(u,v)) of four contiguous texels 804-810 (i.e., T(1,1)-T(2,2)) surrounding a pixel 802 (e.g., [P(u),P(v)]) whose value is to be determined by bilinear interpolation between texels 804-810 depending upon the blend factors (i.e., betaU, betaV) specifying the linear weighting values of the texture data associated with texels 804-810 in the two texel space dimensions U and V.

If, in act 704, filter 300 has been configured to undertake filtering of 8-bit texels, then act 706 may comprise undertaking filtering for four pixels at the same time. Thus, as shown in FIG. 4, a first filtered pixel P0's 8-bit significand may be generated by having filter unit 302 filter four input texels in response to the associated blend factors P0.BetaU and P0.BetaV. Similarly, a second filtered pixel P1's 8-bit significand may be generated by having filter unit 304 filter four other input texels in response to the associated blend factors P1.BetaU and P1.BetaV, a third filtered pixel P2's 8-bit significand may be generated by having filter unit 306 filter another four input texels in response to the associated blend factors P2.BetaU and P2.BetaV, and a fourth filtered pixel P3's 8-bit significand may be generated by having filter unit 308 filter an additional four input texel significands in response to the associated blend factors P3.BetaU and P3.BetaV.

Alternatively, if, in act 704, filter 300 has been configured to undertake filtering of 16-bit texels, then act 706 may comprise undertaking filtering for two pixels at the same time. Thus, as shown in FIG. 5, a first portion of a filtered pixel P0's significand may be generated by having filter unit 302 filter the eight highest bits [15:8] of four input texel significands while unit 304 filters the eight lowest bits [7:0] of those four input texel significands to generate a second portion of a filtered pixel P0's significand. The output of units 302 and 304 may then be added together by adder 310 to generate P0's complete 16-bit filtered significand. Units 302 and 304 may both undertake act 706 in response to the blend factors P0.BetaU and P0.BetaV associated with pixel P1.

At the same time and in a similar manner, a first portion of a second filtered pixel P1's significand may be generated by having filter unit 306 filter the eight highest bits [15:8] of another four input texel significands while unit 308 filters the eight lowest bits [7:0] of those four input texel significands to generate a second portion of the second filtered pixel P1's significand. Units 306 and 308 may both undertake act 706 in response to the blend factors P1.BetaU and P1.BetaV associated with pixel P1. The output of units 306 and 308 may then be added together by adder 312 to generate P1's complete 16-bit filtered significand.

Alternatively, if, in act 704, filter 300 has been configured to undertake filtering of 32-bit texels, then act 706 may comprise undertaking filtering for one pixel at a time. Thus, as shown in FIG. 6, a first portion of a filtered 32-bit pixel P0's significand may be generated by having filter unit 302 filter the eight highest bits [31:24] of four input texel significands, by having unit 304 filter the eight next highest bits [23:16] of those texel significands to generate a second portion of a filtered 32-bit pixel P0's significand, by having unit 306 filter the eight next highest bits [15:8] to generate a third portion of a filtered 32-bit pixel P0's significand, and by having unit 308 filter the lowest bits [7:0] to generate a fourth portion of a filtered 32-bit pixel P0's significand. Units 302-308 may undertake act 706 in response to the blend factors P0.BetaU and P0.BetaV associated with pixel P0. The output of units 302-308 may then be added together by adder 314 to generate P0's complete 32-bit filtered significand.

Process 700 may then continue with the recombination of the filtered significands and associated exponent [act 708]. In one implementation, filter 200 may recombine the exponent passed around bank 204 with the significands in act 708 to yield output data (i.e., one or more filtered pixels) in block normalized format.

The acts shown in FIG. 7 need not be implemented in the order shown; nor do all of the acts necessarily need to be performed. Also, those acts that are not dependent on other acts may be performed in parallel with the other acts. For example, acts 702 and 704 may be undertaken in parallel. Alternatively, act 704 may be undertaken before act 702. Further, at least some of the acts in this figure may be implemented as instructions, or groups of instructions, implemented in a machine-readable medium.

While the foregoing description of one or more instantiations consistent with the claimed invention provides illustration and description of the invention it is not intended to be exhaustive or to limit the scope of the invention to the particular implementations disclosed. Clearly, modifications and variations are possible in light of the above teachings or may be acquired from practice of various implementations of the invention. For example, while FIG. 3 and the accompanying text may show and describe a filter 300 including four filter units 302-308, those skilled in the art will recognize that data processors in accordance with the invention may include filters having more than one filter bank functioning in parallel or having a filter bank employing more or less that four filter units. Clearly, many other implementations may be employed to provide a reconfigurable floating point filter consistent with the claimed invention.

No device, element, act, data type, instruction etc. set forth in the description of the present application should be construed as critical or essential to the invention unless explicitly described as such. Also, as used herein, the article "a" is intended to include one or more items. Moreover, when terms or phrases such as "coupled" or "responsive" or "in communication with" are used herein or in the claims that follow, these terms are meant to be interpreted broadly. For example, the phrase "coupled to" may refer to being communicatively, electrically and/or operatively coupled as appropriate for the context in which the phrase is used. Variations and modifications may be made to the above-described implementation(s) of the claimed invention without departing substantially from the spirit and principles of the invention. All such modifications and variations are intended to be included herein within the scope of this disclosure and protected by the following claims.

What is claimed:

1. A system comprising:
    a processor to generate, in parallel, an amount of filtered floating point format data dependent on the data width of the input data to be filtered by the processor, wherein the processor right shifts at least some of the input data significands, wherein right shifting at least some of the input data significands includes right shifting the input data significands other than the input data significand of the input data having the largest exponent value, and wherein each input data significand right shifted is right shifted by an amount corresponding to a difference between the exponent associated with that input data significand and the largest exponent value, wherein the input data to be filtered comprises the input data significands, wherein the processor block normalizes the input data to be filtered and filters the input data significands to generate one or more output data significands, and wherein the data filter multiplies each output data significand by a largest exponent value associated with the input data significands; and
    a storage coupled to said processor.

2. The system of claim 1, wherein the processor includes a texture filter, the input data is texel data, and the filtered data is filtered pixel data.

3. A system comprising:
- a processor to generate, in parallel, an amount of filtered floating point format input data dependent on the data width of the input data to be filtered by the processor, the processor to filter the input data significands to generate one or more output data significands, and wherein the data filter multiplies each output data significand by a largest exponent value associated with the input data significands; and
- a storage coupled to said processor.

4. The system of claim 3, wherein the processor block normalizes the input data to be filtered.

5. The system of claim 3, wherein the processor includes a texture filter, the input data is texel data, and the filtered data is filtered pixel data.

* * * * *